United States Patent
Freund

(10) Patent No.: US 10,611,329 B2
(45) Date of Patent: Apr. 7, 2020

(54) SHOCK ABSORBING SPEAKER

(71) Applicant: Panasonic Automotive Systems Company Of America, Division of Panasonic Corporation Of North America, Peachtree City, GA (US)

(72) Inventor: Katherine Jennette Freund, Livonia, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 236 days.

(21) Appl. No.: 15/599,168

(22) Filed: May 18, 2017

(65) Prior Publication Data
US 2017/0334384 A1    Nov. 23, 2017

Related U.S. Application Data

(60) Provisional application No. 62/340,327, filed on May 23, 2016.

(51) Int. Cl.
| | |
|---|---|
| *B60R 21/0136* | (2006.01) |
| *B60R 21/20* | (2011.01) |
| *H04R 1/02* | (2006.01) |
| *H04R 7/12* | (2006.01) |
| *H04R 9/04* | (2006.01) |
| *B60R 21/01* | (2006.01) |
| *B60R 21/207* | (2006.01) |

(52) U.S. Cl.
CPC .......... *B60R 21/0136* (2013.01); *B60R 21/20* (2013.01); *H04R 1/023* (2013.01); *H04R 1/025* (2013.01); *H04R 7/127* (2013.01); *H04R 9/043* (2013.01); *B60R 2021/01081* (2013.01); *B60R 2021/01211* (2013.01); *B60R 2021/2074* (2013.01); *H04R 2400/11* (2013.01); *H04R 2499/13* (2013.01)

(58) Field of Classification Search
CPC ................ B60R 21/0136; B60R 21/20; B60R 2021/01081; B60R 2021/01211; B60R 2021/2074; H04R 1/023; H04R 1/025; H04R 7/127; H04R 9/043; H04R 2400/11; H04R 2499/13
See application file for complete search history.

(56) References Cited

U.S. PATENT DOCUMENTS

| | | | | |
|---|---|---|---|---|
| 6,367,579 B1 * | 4/2002 | Wiener | .................. | H04R 1/021 181/156 |
| 7,543,677 B2 * | 6/2009 | Igawa | ................. | B60R 21/0134 180/274 |

(Continued)

FOREIGN PATENT DOCUMENTS

KR    10-2015-0166178    *  5/2018

*Primary Examiner* — Thomas E Worden
(74) *Attorney, Agent, or Firm* — Laurence S. Roach, Esq.

(57) ABSTRACT

A loudspeaker arrangement in a motor vehicle includes a collision sensor transmitting a collision signal in response to detecting that the motor vehicle has been in a collision. An audio system transmits an audio signal. A loudspeaker includes an air bag connected thereto. The loudspeaker is coupled to the audio system and produces audible sounds based on the audio signal. The air bag is coupled to the collision sensor and is activated in response to the collision sensor transmitting the collision signal.

8 Claims, 2 Drawing Sheets

(56) References Cited

U.S. PATENT DOCUMENTS

| | | | | |
|---|---|---|---|---|
| 7,584,988 | B2* | 9/2009 | Okamoto | B60R 21/36 |
| | | | | 180/274 |
| 8,002,307 | B2* | 8/2011 | Schmierer | B60R 1/12 |
| | | | | 180/274 |
| 9,067,566 | B1* | 6/2015 | Raines | B60R 21/045 |
| 2007/0009133 | A1* | 1/2007 | Gerkinsmeyer | H04R 7/127 |
| | | | | 381/398 |
| 2007/0018440 | A1* | 1/2007 | Reiter | B60H 1/00564 |
| | | | | 280/732 |
| 2008/0136144 | A1* | 6/2008 | Spahr | B60R 21/205 |
| | | | | 280/728.3 |
| 2008/0273738 | A1* | 11/2008 | Smith | H04R 1/02 |
| | | | | 381/386 |
| 2009/0202090 | A1* | 8/2009 | Eaton | H04R 1/42 |
| | | | | 381/190 |
| 2011/0163884 | A1* | 7/2011 | Tame | G08G 1/205 |
| | | | | 340/626 |
| 2011/0164759 | A1* | 7/2011 | Gratke | H04R 1/08 |
| | | | | 381/91 |
| 2013/0133971 | A1* | 5/2013 | Rick | B60R 21/36 |
| | | | | 180/274 |
| 2014/0341411 | A1* | 11/2014 | Mohindra | B65D 55/028 |
| | | | | 381/334 |
| 2016/0302010 | A1* | 10/2016 | Sebastian | H04R 23/008 |
| 2017/0155989 | A1* | 6/2017 | Jeon | H04R 1/026 |
| 2017/0210329 | A1* | 7/2017 | Rao | B60R 21/0136 |
| 2018/0048949 | A1* | 2/2018 | Chen | A63H 23/00 |

\* cited by examiner

SHOCK ABSORBING SPEAKER

CROSS-REFERENCE TO RELATED APPLICATION

This application claims benefit of U.S. Provisional Application No. 62/340,327 filed on May 23, 2016, which the disclosure of which is hereby incorporated by reference in its entirety for all purposes.

FIELD OF THE INVENTION

The disclosure relates to a loudspeaker arrangement for use in a motor vehicle.

BACKGROUND OF THE INVENTION

There are increasing safety concerns about the placements of speakers near the passengers' heads within a motor vehicle. Speakers have hard and/or sharp parts which could potentially injure a passenger in a collision.

SUMMARY

The present invention may provide a loudspeaker located in the headrest, or near a passenger's head, within the passenger compartment of a motor vehicle. The speaker includes features to prevent the passenger from becoming injured if he collides with the speaker, such as in the event of a vehicle collision. Thus, the invention provides alternative uses for the speaker other than producing audio sound. That is, the speaker may also protect the passenger's body from injury in an accident.

In one embodiment, the invention comprises a loudspeaker arrangement in a motor vehicle, including a collision sensor transmitting a collision signal in response to detecting that the motor vehicle has been in a collision. An audio system transmits an audio signal. A loudspeaker includes an air bag connected thereto. The loudspeaker is coupled to the audio system and produces audible sounds based on the audio signal. The air bag is coupled to the collision sensor and is activated in response to the collision sensor transmitting the collision signal.

In another embodiment, the invention comprises a method of operating a motor vehicle, including using a collision sensor to transmit a collision signal in response to detecting that the motor vehicle has been in a collision. An audio signal is transmitted from an audio system. A loudspeaker is provided including an air bag connected thereto. The loudspeaker is coupled to the audio system. The loudspeaker is used to produce audible sounds based on the audio signal. The air bag is coupled to the collision sensor. The air bag is activated in response to the collision sensor transmitting the collision signal.

In yet another embodiment, the invention comprises a loudspeaker for a motor vehicle. The loudspeaker includes a spider connected to a frame. A cone is connected to the frame. The spider and/or the cone is configured to absorb an impact of a passenger of the motor vehicle in the event of a collision.

In a further embodiment, the invention comprises a loudspeaker arrangement for a motor vehicle, including a loudspeaker attached to a mounting structure. The loudspeaker is detachable from the mounting structure by a force exerted on the loudspeaker by a passenger of the motor vehicle during a collision.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
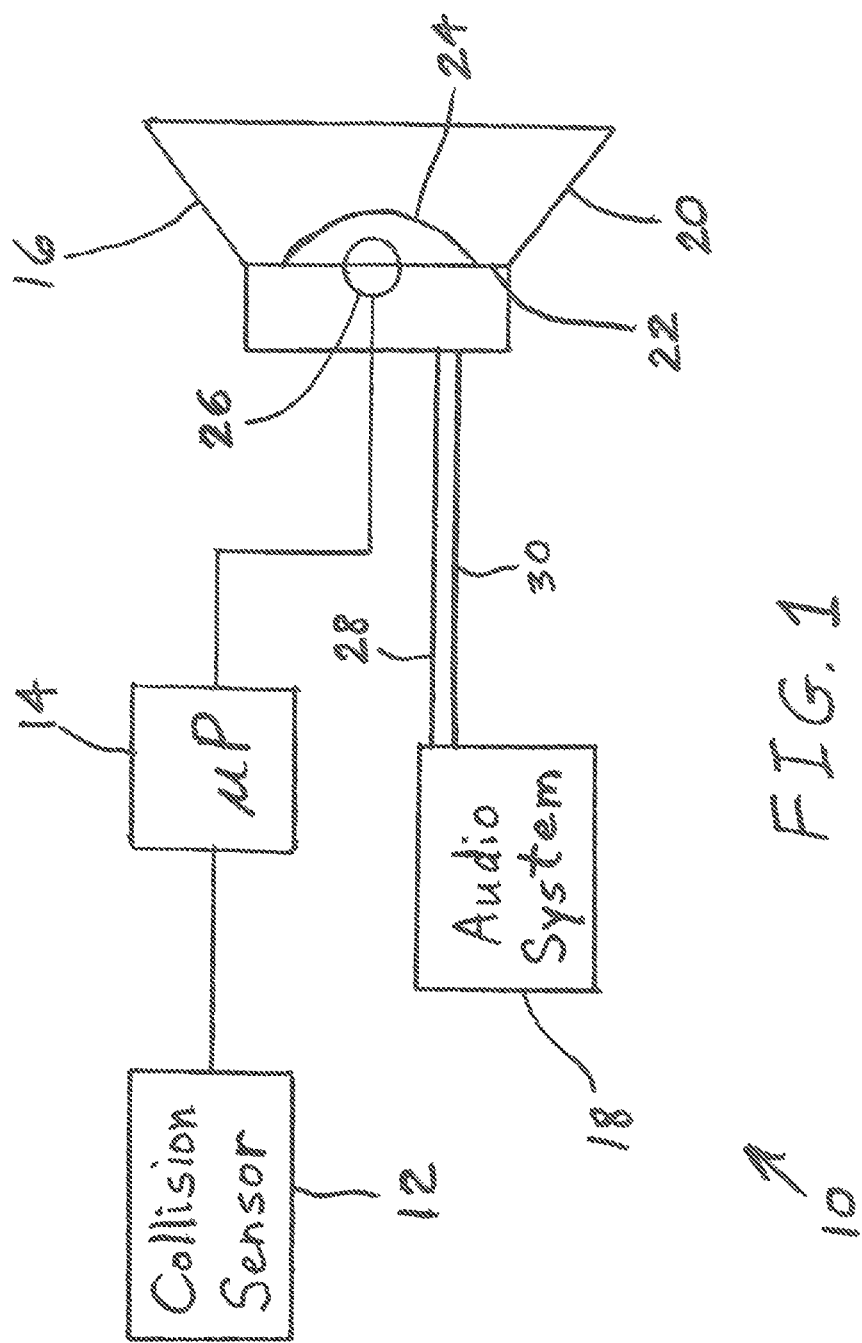
FIG. 1 is a block diagram of one example embodiment of a vehicular loudspeaker arrangement of the present invention.

FIG. 1 illustrates a vehicular loudspeaker arrangement 10 of the present invention, including a collision sensor 12, an electronic processor 14, a loudspeaker 16 and an audio system 18. Collision sensor 12 may be the same collision sensor that is used in the vehicle to trigger the conventional air bags in the dashboard and/or steering wheel.

Loudspeaker 16 includes a cone 20, a spider 22, a dust cap 24 and an air bag 26. Air bag 26 may be a miniaturized version of a conventional air bag, and may be covered by dust cap 24.

Electronic processor 14 may be a microprocessor electrically connected to both collision sensor 12 and air bag 26. Audio system 18 may be a conventional audio system including a radio that drives loudspeaker 16 via audio signals carried on lines 28, 30.

In operation, loudspeaker 16 may release airbag 26 from dust cap 24 in the event of a collision. More particularly, in the event of a collision, collision sensor 12 transmits a collision signal to processor 14. Processor 14 then responds by sending an activation signal to air bag 26, causing air bag 26 to be deployed. Before being deployed, air bag 26 may have a width of approximately between one-quarter inch and one inch. Upon being deployed, air bag 26 may burst through dust cap 24 and expand to a width of approximately between one foot and three feet, for example. It is also possible for the collision sensor to transmit an activation signal directly to the air bag in the event of a collision.

In another embodiment, spider 22 and cone 20 of the speaker may be configured to absorb the impact of the passenger in the event of a collision. For example, spider 22 and cone 20 may have a spring-like or accordion-like structure that compresses in response to being hit by a passenger. Alternatively, spider 22 and cone 20 may be made of a material that is crushed or that crumbles in response to being hit by a passenger.

It is also possible for the frame or basket of the loudspeaker to be configured to absorb the impact of the passenger in the event of a collision. For example, the frame may have a line or curve of perforations which allow the frame to break or bend at the perforations when hit by a passenger. The perforations may be in a circular shape that is concentric with a center of the speaker. Alternatively, the frame may have a line or curve of thinner material that functions as a hinge that allows the frame to bend when hit by a passenger.

In yet another embodiment, the speaker may be designed to break away in the event of a collision. That is, the speaker may break away from the structure to which it is mounted, which may be a headrest, or a ceiling or wall within the passenger compartment. For example, the frame of the speaker may be attached to the frame of the headrest by a ceramic bracket that breaks when a sufficient level of force is exerted thereon, such as the level of force that would typically be exerted by a passenger's body during a collision. Alternatively, the speaker may be attached to the frame of the headrest by metal or plastic snaps or connectors that disconnect or break apart when a sufficient level of force is exerted thereon, such as the level of force that would typically be exerted by a passenger's body during a collision. The above-described configurations may also be applied to speakers attached to a dashboard, ceiling or wall of the passenger compartment, rather than to the headrest.

Figure 2:
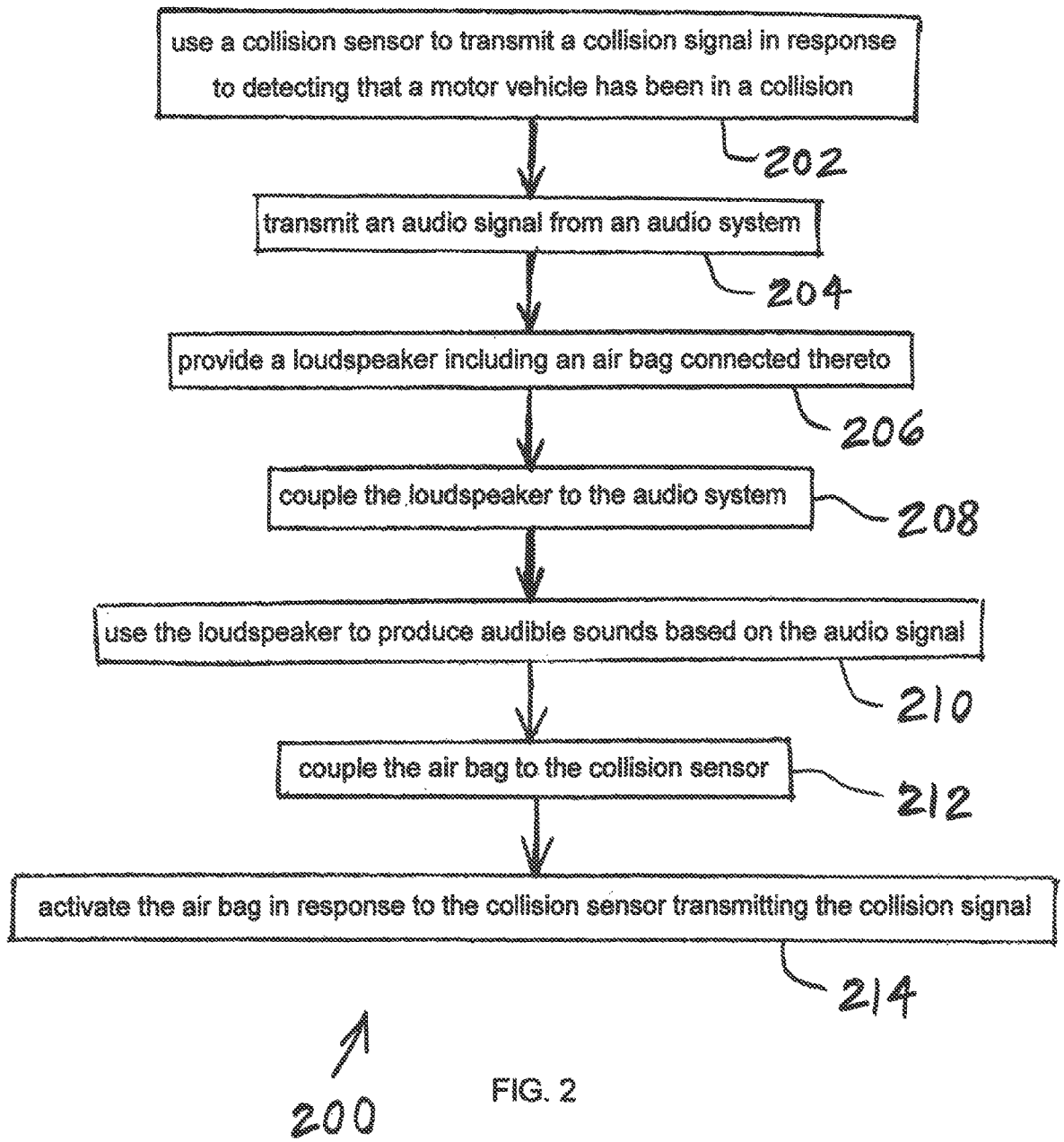
FIG. 2 is a flow chart of one embodiment of a method of the present invention for operating a motor vehicle.

FIG. 2 illustrates one embodiment of a method 200 of the present invention for operating a motor vehicle. In a first step 202, a collision sensor is used to transmit a collision signal in response to detecting that the motor vehicle has been in a collision. For example, collision sensor 12 may transmit a collision signal to processor 14 in response to detecting that the motor vehicle has been in a crash.

Next, in step 204, an audio signal is transmitted from an audio system. For example, audio system 18 may transmit an audio signal, such as a radio signal or a signal from a compact disc player.

In a next step 206, a loudspeaker including an air bag connected thereto is provided. For example, loudspeaker 16 includes an air bag 26 which may be attached to a spider 22 or cone 20 of the speaker. Air bag 26 may also be secured beneath a dust cap 24 of the speaker.

In step 208, the loudspeaker is coupled to the audio system. For example, loudspeaker 16 may be connected to audio system 18 by speaker wire.

Next, in step 210, the loudspeaker is used to produce audible sounds based on the audio signal. For example, loudspeaker 16 may audibly play music or talk based on the audio signals received via the speaker wire from audio system 18.

In a next step 212, the air bag is coupled to the collision sensor. For example, electronic processor 14 may electronically couple collision sensor 12 to air bag 26.

In a final step 214, the air bag is activated in response to the collision sensor transmitting the collision signal. For example, electronic processor 14 may receive the collision signal from collision sensor 12, and, in response thereto, may transmit an activation signal to air hag 26.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or pound, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A loudspeaker arrangement in a motor vehicle, comprising:
a collision sensor configured to transmit a collision signal in response to detecting that the motor vehicle has been in a collision;
an audio system configured to transmit an audio signal; and
a loudspeaker including a dust cap, an air bag being secured beneath the dust cap and attached to a spider of the loudspeaker, the loudspeaker being coupled to the audio system and configured to produce audible sounds based on the audio signal, the air bag being coupled to the collision sensor and configured to be activated in response to the collision sensor transmitting the collision signal.

2. The loudspeaker arrangement of claim 1 further comprising an electronic processor interconnecting the collision sensor and the air bag, the electronic processor being configured to cause the air bag to activate in response to the electronic processor receiving the collision signal.

3. The loudspeaker arrangement of claim 1 wherein the air bag is configured to burst through the dust cap upon being activated.

4. The loudspeaker arrangement of claim 1 wherein the collision sensor is configured to activate at least one other air bag in the motor vehicle.

5. A loudspeaker arrangement in a motor vehicle, comprising:
a collision sensor configured to transmit a collision signal in response to detecting that the motor vehicle has been in a collision;
an audio system configured to transmit an audio signal; and
a loudspeaker including a dust cap, an air bag being secured beneath the dust cap and attached to a cone of the loudspeaker, the loudspeaker being coupled to the audio system and configured to produce audible sounds based on the audio signal, the air bag being coupled to the collision sensor and configured to be activated in response to the collision sensor transmitting the collision signal.

6. The loudspeaker arrangement of claim 5 further comprising an electronic processor interconnecting the collision sensor and the air bag, the electronic processor being configured to cause the air bag to activate in response to the electronic processor receiving the collision signal.

7. The loudspeaker arrangement of claim 5 wherein the air bag is configured to burst through the dust cap upon being activated.

8. The loudspeaker arrangement of claim 5 wherein the collision sensor is configured to activate at least one other air bag in the motor vehicle.

\* \* \* \* \*